April 2, 1940. E. L. THEARLE 2,196,039
BALANCING APPARATUS
Filed Feb. 1, 1938 2 Sheets-Sheet 1

Inventor:
Ernest L. Thearle,
by Harry E. Dunham
His Attorney.

April 2, 1940.                    E. L. THEARLE                    2,196,039
                                BALANCING APPARATUS
                             Filed Feb. 1, 1938                  2 Sheets-Sheet 2
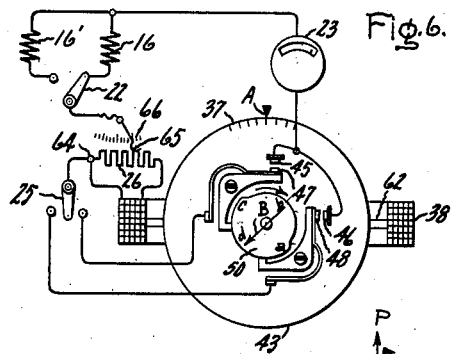
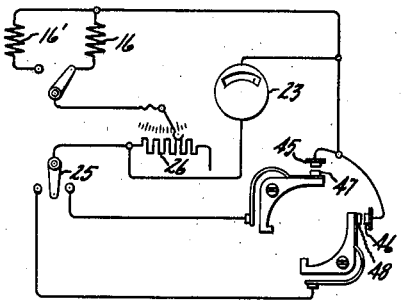
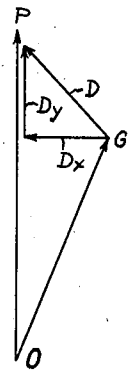
Fig.4.
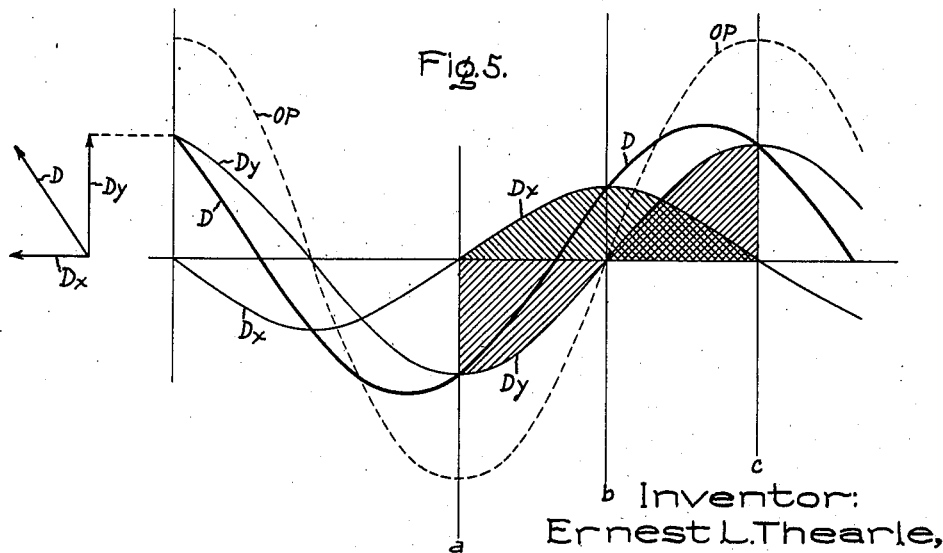
Fig.5.
Inventor:
Ernest L. Thearle,
by Harry E. Dunham
His Attorney.

Patented Apr. 2, 1940

2,196,039

UNITED STATES PATENT OFFICE 2,196,039

BALANCING APPARATUS

Ernest L. Thearle, Schenectady, N. Y., assignor to General Electric Company, a corporation of New York Application February 1, 1938, Serial No. 188,205

3 Claims. (Cl. 73—53)

The present invention relates to an improved apparatus for analyzing the unbalance of rotating bodies.

It is a primary object of the invention to make available a highly accurate and reliable means of analyzing the magnitude and time phase relation of vibrations caused by the rotation of a dynamically unbalanced body. To this end I provide an improved apparatus such that the most sensitive instrument utilized in the apparatus is required to give only null or zero readings. As is well known in the metering art, the fulfillment of this condition means that the accuracy of the apparatus as a whole is substantially independent of small errors or variations in the calibration of the instrument so that a relatively inexpensive and rugged instrument may be employed without impairing the certainty of obtaining good results.

It is a further object of the invention to provide means by which the method of null readings may be readily applied in the determination of both the magnitude and phase relation of the particular unbalance vibrations being studied.

In accordance with my invention, the objects stated in the foregoing are accomplished by evaluating each of the unknowns under conditions which cause some observable index factor to be reduced to zero when an accurate evaluation of either unknown is reached.

Figure 1:
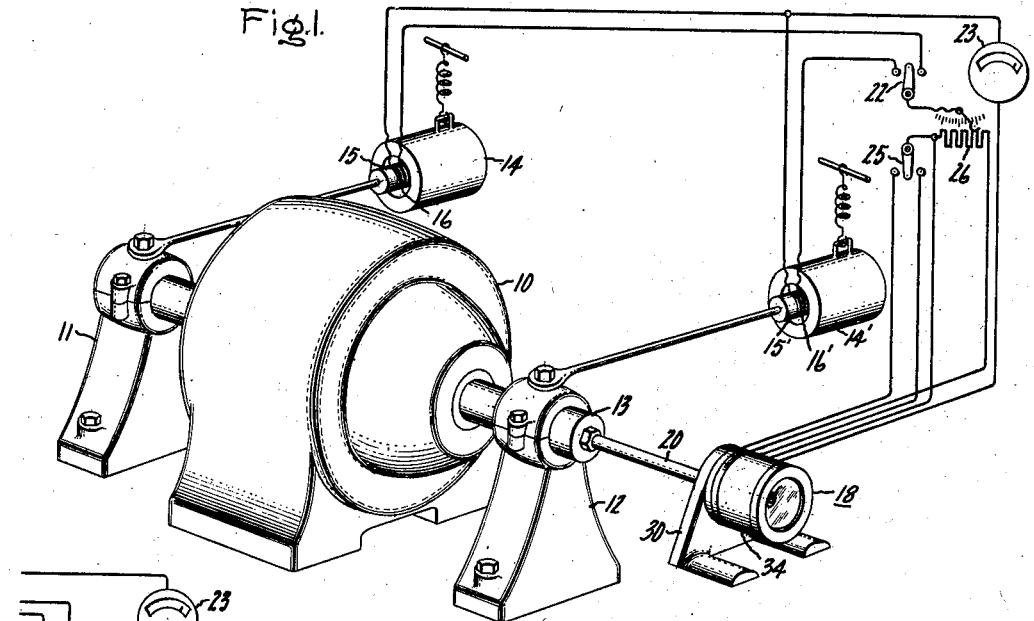
Figure 2:
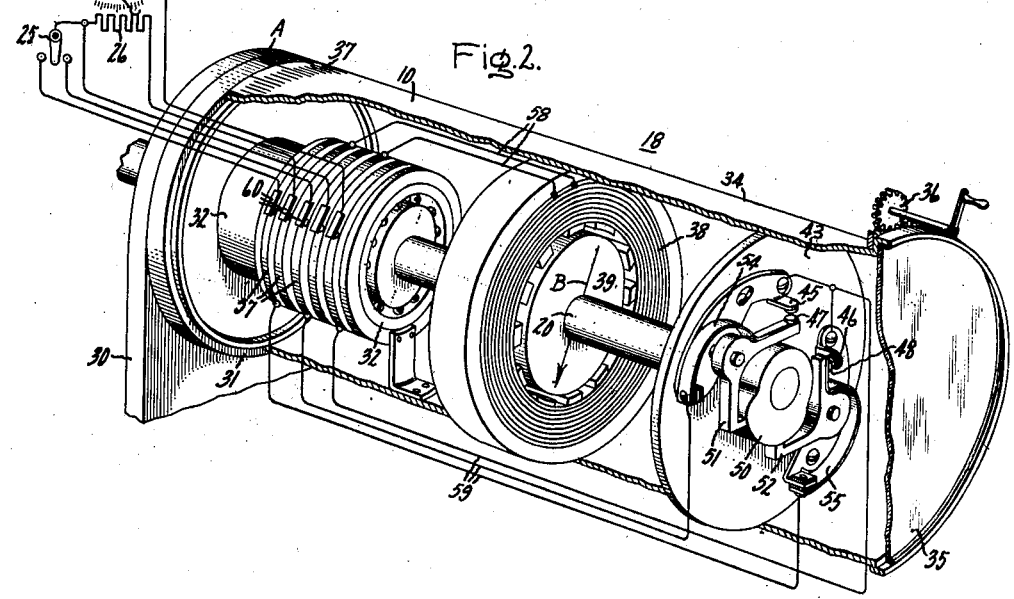

The features of novelty which I desire to protect herein are pointed out with particularity in the appended claims. The invention itself together with further objects and advantages thereof may best be understood by reference to the following description taken in connection with the drawings in which Fig. 1 is a diagrammatic illustration of the application of my improved apparatus to a machine for balancing its rotor; Fig. 2 is a sectional detailed view of a portion of the apparatus; Fig. 3 illustrates schematically the circuit connections of the apparatus; Figs. 4 and 5 are graphical representations useful in explaining the invention, and Fig. 6 illustrates an alternative arrangement of the circuit elements.

Referring to Fig. 1 I have shown as an object of analysis an electrical motor comprising a stator frame 10 and bearing pedestals 11 and 12. It will be understood that the stator frame encloses a cooperating rotor (not shown), which is supported on bearing pedestals by means of the externally projecting shaft 13. If the rotor in question is not dynamically balanced, its rotation at high speed will produce substantial vibrations of the pedestals 11 and 12 (as well as other parts of the stationary structure). In an article published in the Transactions of the A. S. M. E. for October, 1934, I have described a method whereby the amount and location of the unbalance masses associated with the rotor may be computed after analysis of the vibrations produced at opposite ends of the rotor by such masses and by certain trial weights applied to the rotor. My present invention provides apparatus for carrying out the various steps of the vibration analysis with a maximum of accuracy and convenience.

For generating an observable quantity having characteristics of phase and magnitude corresponding to those of the vibrations under consideration, I provide a pair of independently usable vibration-responsive devices 14 and 14' which are adapted for connection to the pedestals or to other externally accessible parts of the motor. (A single device may be used and transferred from point to point as required, but for convenience I prefer to employ two devices, as shown.) Each device includes a stationary part (indicated by the lead-line from the numerals 14, 14'), which preferably comprises a permanent magnet or other field-producing means, and a relatively movable part 15, 15'. Each movable part has a coil 16, 16', wound thereon which is adapted to have a voltage induced therein as a result of the vibrations to which the device is subjected. In the case illustrated the phase and magnitude of these voltages will be respectively determined by the horizontal vibrations of the pedestals 11 and 12, which are responsive to the rotation of the unbalanced masses associated with the rotor. Their frequency will correspond to the frequency of rotation of the rotor.

In addition to the vibration-responsive devices just described, there is provided what may be temporarily referred to as "an auxiliary apparatus" 18, this being fully described in the following. It is sufficient, at the moment, to point out that it is provided with a shaft 20 which is adapted for connection with the shaft 13 of the rotor under test and for rotation therewith.

Connected between the apparatus 18 and the devices 14 and 14' there are provided a number of circuit elements including a two-way switch 22 for effecting connection to one or the other of the vibration responsive devices, an indicating instrument 23, which is preferably a direct current galvanometer having a center-scale zero point, another two-way switch 25, and a variable contact potentiometer 26. The function of the last two elements will be fully explained hereinafter.

As appears in Fig. 2 the auxiliary apparatus 18 includes a stationary base 30 having a flanged ring 31 and a hollow cylindrical projection 32 fixedly secured thereto. There is also provided an elongated cylindrical casing 34 which is so supported from the projection 32 as to be rotatable about its longitudinal axis. This casing terminates at one end in a transparent closure member 35 adapted to permit observation of the enclosed mechanism, and is provided with a crank and gear arrangement 36 to facilitate convenient rotation. An index mark A, placed on the stationary ring 31, affords a fixed reference which, in combination with a scale 37 on casing 34, makes it possible to measure the rotation of the casing with respect to some selected normal position.

Within the casing there is provided an electrical generator comprising a stator winding 38 and a rotor 39. The rotor 39 may comprise a permanent magnet such, for example, as a magnet of the aluminum-nickel-cobalt alloy sold under the trade name Alnico. This may be polarized in a given diametral direction as indicated by the arrow B and may be connected to an extension of the shaft 20 (Fig. 1) so as to be rotatable therewith. Its function is to induce in the winding 38 a sinusoidal voltage of the same frequency as the voltage induced in the vibration responsive devices 14 and 14' by vibration of the pedestals 11 and 12. The winding 38 is rotatable with the casing 34 so as to permit adjustment of the relative time phase of the voltage produced in the winding.

Also within the casing and secured thereto there is provided a base plate 43 bearing thereon two alternatively usable circuit interrupters which are operated cyclically in accordance with the rotation of the shaft 20. These interrupters each comprise stationary contacts, respectively numbered 45 and 46, and relatively movable contacts, respectively numbered 47 and 48. In order to activate the movable contacts 47 and 48 to open circuit position there is provided a cam 50 secured to the shaft 20. This operates upon followers 51 and 52 which are respectively associated with the contacts 47 and 48. In order to effect closing of the contacts during favorable positions of the cam 50, there are provided leaf springs 54 and 55 which operate on the contacts 47 and 48.

So that rotational motion of the casing 34 may be accomplished without destroying the circuit connections to the generator 38 and to the contacts just described, there are provided a plurality of slip rings 57 which are movable with the casing. Certain of these are connected to the generator by means of conductors 58, and certain others are connected to the contacts 45, 46, 47 and 48 by means of conductors 59. A set of stationary brushes 60 cooperating with the slip rings facilitates connection with the external circuit elements.

The mode of cooperation of the elements so far referred to may best be understood by reference to the diagrammatic representation of Fig. 3 in which parts previously referred to are similarly numbered. The stator winding 38 of the generator is represented as a concentrated coil arranged in a plane parallel to the axis of rotation of the rotating parts. Its fixed relation with respect to the contact bearing plate 43 is indicated by rigid connections 62 extending between the coil and the plate.

The generator winding 38 is connected directly across the terminals of the potentiometer 26 so that a portion of its voltage appears between the terminal 64 and the adjustable contact 65. With the switch 22 in the position indicated this portion may be made to oppose the voltage developed in the coil 16. (The magnitude of this opposing voltage may be determined by noting the position of the adjustable contact 65 with respect to a properly calibrated scale 66.)

It will be seen that with the switch 25 thrown to the left and with the contacts 46 and 48 closed, the instrument 23 is subjected to a sinusoidal voltage equal to the difference between the voltage developed in the coil 16 and that developed between terminal 64 and contact 65. The former voltage has characteristics of magnitude and phase which are fixed by the vibrations to which the coil 16 is subjected and consequently by the nature of the unbalance of the rotor under test. The latter voltage may be varied as to magnitude by adjustment of the potentiometer and as to phase by varying the position of the winding 38.

Ignoring for the moment the fact that the contacts 46 and 48 are closed only intermittently, the conditions existing may be represented vectorially as illustrated in Fig. 4. In this figure, the vector OP represents the voltage of the winding 38 and the vector OG represents that of the coil 16. The vector D, which is obtained by the mathematically familiar expedient of completing the triangle, from P to G represents the difference between OP and OG. It therefore represents also the voltage which is impressed on the instrument 23.

If D is to be reduced to zero, OP must be equal in value to OG and the phase difference between them must be zero (i. e., OP must oppose OG and completely balance it). Consequently, if the magnitude and phase relation of OP required to fulfill this condition are objectively measured, the same quantities will be known with respect to OG and the characteristics of the vibrations responsible for the voltage OG will have been determined. As stated in the prefatory portion hereof, it is a primary purpose of the present invention to provide means whereby this can be accomplished by a method of null readings.

As is well understood in vector mathematics, the voltage D can be regarded as made up of two components $D_y$ and $D_x$, which are respectively in phase with OP and ninety degrees out of phase with it. This is shown in another form of representation in Fig. 5 in which the sinusoidal curves OP, D, $D_x$ and $D_y$ respectively illustrate the time variations of the vectorial quantities (voltages) OP, D, $D_x$ and $D_y$ previously referred to. It will be seen by inspection that the curve D represents the sum of the two curves $D_x$ and $D_y$, of which the former is primarily a function of the difference in phase between OP and OG Fig. 4) and the latter is primarily a function of the difference in magnitude of these quantities. My invention provides means for dealing with these two functions independently and thus for studying separately the relative time phase and magnitude of the vibrations under investigation.

Referring to Figs. 2 and 3, such means comprises the two circuit interrupters which respectively include the contacts 45 and 47 and the contacts 46 and 48, in combination with the cam 50 for properly timing their operation. With the contact positions shown and with the axis of polarization of the rotor 39 (Fig. 2) bearing a fixed relation to the cam 50 such as is indicated by the arrow B (Figs. 2 and 3) the contacts 46 and 48 will close when the voltage induced in coil 38 is a maximum (i. e., when the rate at which the magnetic flux cuts the coil is at its highest value). Similarly, the contacts 45 and 47 will close 90 degrees later or when the voltage of the coil 38 is at a minimum. Or, stated in another way, the center of the closure period of the contacts 45 and 47 will occur when the voltage OP is a maximum, and the center of the closure period of the contacts 46—48 will occur when the voltage OP is a minimum. If these latter conditions are fulfilled, it is not essential that the periods of circuit closure correspond precisely to a half cycle of voltage as indicated. On the contrary, as long as the periods are equal, they may be of any length appreciably different from a full voltage cycle.

Referring now to both Figs. 3 and 5 let us assume that the switch 25 is thrown to the left so that the contacts 46 and 48 are in circuit. Under these conditions the instrument 23 will be subjected to the difference voltage D whenever the contacts are closed. The deflection of the movable element of the instrument will be proportional to the integrated value of this voltage (as integrated over each period of circuit closure). What is the same thing, it will be proportional to the integrated sum of the components $D_x$ and $D_y$.

It has already been pointed out that the center of the closure period of the contacts 46 and 48 occurs when the voltage OP is a minimum. Referred to Fig. 5, this corresponds, for example, to the time $b$. The deflection of the instrument 23 will thus be proportional to the integrated sum of the quantities $D_x$ and $D_y$ from the times $a$ to $c$, or, that is, to the algebraic sum of the cross-hatched areas lying under the curves $D_x$ and $D_y$. Consideration of these areas shows that within the region affected, the integrated value of the curve $D_y$ is zero, the positive portion (i. e., the portion above the zero line) being exactly offset by the negative portion (below the zero line). Consequently the deflection of the instrument 23 is determined solely by the quantity $D_x$, that is to say, by a function of the phase displacement between the voltage OG and the voltage OP. (See Fig. 4.) By ascertaining the phase relation (with respect to some objective reference) of OP which is required to reduce this displacement to zero, one may by the same act determine the phase relation of the voltage OG and consequently that of the unbalance vibrations to which such voltage is attributable.

This may be done, for example, by simultaneously varying the angular positions of the generator winding 38 and of the contact bearing plate 43 with respect to some known reference, say, the index mark A (Fig. 2). (Such simultaneous variation assures that the center of the circuit-closure period shall remain coincident with the zero or minimum point of the curve $D_y$ as illustrated in Fig. 5.) Referring to Fig. 2, the desired angular adjustment may be accomplished by turning the crank 36 to cause rotary motion of the casing 34 and of the parts 38 and 43 affixed thereto. As soon as a null reading of the instrument 23 is attained, the time phase relation of the voltage OG (that is, the voltage of the coil 16) may be ascertained by noting the position of the scale 37 with respect to the fixed reference point A.

To determine the magnitude of the voltage of the coil 16 after its phase relation is ascertained, the switch 25 is thrown to the right to put the contacts 45 and 47 in circuit. With this arrangement the center of the circuit closure period is advanced 90 degrees to the point $c$. Consequently, the deflection of the instrument 23 becomes dependent only on the difference in magnitude between the vectors OG and OP. (The angular displacement between them has become zero due to the adjustment previously made, and in any case, the center of integration now coincides with a minimum of the curve $D_x$ so that the quantity $D_x$ is incapable of affecting the instrument deflection.) By now adjusting the setting of the potentiometer 26 until another null reading of the instrument 23 is obtained the magnitude of the voltage developed by coil 16 may be determined. This will be ascertained somewhat indirectly by inspection of the potentiometer setting, since this measures directly the equal and opposite voltage required to balance that of the coil 16. Either of these values is a measure of the magnitude of the horizontal vibration of the pedestal 11.

One mode of use of the apparatus described in the foregoing may be summarized as follows:

With the circuit connections illustrated in Fig. 3 and with the switch 25 thrown to the left, the contact bearing base plate 43 and the generator winding 38 may be simultaneously rotated until a null reading of the meter 23 is obtained. The relative position of the scale 37 with respect to the reference point A when this condition is reached will be an indication of the relative time phase of the vibrations of the pedestal 11. After this reading is obtained and without changing the position of the winding 38, the switch 25 may be thrown to its right hand position so as to place the contacts 45 and 47 in circuit. Thereafter an adjustment of the potentiometer contact is made until the meter 23 again gives a zero or null indication. If the potentiometer scale 66 is properly calibrated its reading at this time will be an indication of the magnitude of the vibrations of the pedestal 11. By next throwing the switch 22 to its left-hand position so as to place the coil 16' in circuit, similar observations may be made to determine the relative time phase and the magnitude of the vibrations of the pedestal 12. By properly correlating these values with certain other required data according to known methods of computation, the location and amount of the rotor unbalance may be ultimately determined.

Instead of the procedure outlined in the preceding paragraph it is in some cases preferable to adjust both the phase and magnitude of the potentiometer voltage before making any observations. In this event, my invention simplifies the operator's task by making it possible to carry out the phase and magnitude adjustments separately. If desired, a preliminary coarse adjustment of each variable may be made, and then a final precise adjustment sought by throwing the switch 25 back and forth while alternately varying the setting of the contacts and of the potentiometer until a null meter reading is obtained for both switch positions.

In Fig. 6 I have shown diagrammatically a modification of the invention which differs from that previously described principally in the manner in which the indicating instrument is connected in circuit with the other elements of the apparatus. In this figure parts which have been described in connections with Fig. 3 are identified by the same numerals in order to avoid confusion. It will be seen that in this case the meter 23 is connected in such a manner as to be shunted by one or the other of the circuit interrupters during the period of circuit closure. For example, with the switch 25 in its left-hand position, the meter is shunted when the contacts 46 and 48 are closed. This means that the reading of the meter will be in accordance with the integrated value of the voltage appearing across these contacts during their open periods. From the standpoint of the operation of the apparatus the only effect of this change is to advance the center of integration 180° with respect to that prevailing in the modification previously described. The results obtained are otherwise unchanged.

The arrangement just described has the practical advantage of rendering the results obtained entirely independent of the contact resistance of the circuit interrupters. Even where the nature of the contact between the relatively movable contact members is extremely poor the meter will nevertheless be effectively short-circuited so that no error in results will obtain from this defect.

While I have referred particularly in the foregoing to circuit interrupters comprising cam and contact arrangements, it will be understood that various other types of interrupter may be alternatively employed. Furthermore, while I have exemplified my invention by reference to a particular construction and particular circuit arrangements, it will be understood that numerous modifications may be made by those skilled in the art without departing from the invention. I, therefore, aim in the appended claims to cover all such equivalent modifications as come within the true spirit and scope of the foregoing invention.

What I claim as new and desire to secure by Letters Patent of the United States is:

1. In apparatus for analyzing the unbalance of a rotating body, the combination of a device for developing a first alternating voltage having characteristics of magnitude and phase determined by unbalance vibrations of the body, a generator for developing a second alternating voltage of the same frequency as the first, means for measurably varying the magnitude of said second voltage, an electrical instrument adapted to indicate null values of voltages impressed thereon, means in circuit with said device and said generator for intermittently impressing on said instrument the difference of the first and second voltages, said last named means comprising two alternatively usable circuit interrupters each operable cyclically in fixed time relationship to the variations of said second voltage, and means for simultaneously and measurably advancing or retarding the periods of circuit interruption and the time phase relation of said second voltage, the relation of the two interrupters being such that the phase relation of the said first alternating voltage may be determined by the use of one of the interrupters in conjunction with the said means for advancing or retarding the periods of circuit interruption, and that the magnitude of such voltage may be separately determined by use of the other interrupter in connection with said means for varying the magnitude of the second voltage.

2. In apparatus for analyzing the unbalance of a rotating body the combination of a vibration-responsive device for generating a first alternating voltage having characteristics of magnitude and phase which are determined by the similar characteristics of selected unbalance vibrations of the body, means including a generator for developing a second alternating voltage having the same frequency as the first, a direct current instrument adapted to indicate null values of voltages impressed thereon, means including a circuit interrupter in circuit with said instrument for intermittently impressing the difference of said first and second voltages thereon, a predetermined fixed relation being maintained between the periods of circuit interruption and the time phase relation of said second voltage, and means for simultaneously varying the last-named quantities without destroying such fixed relation, the relation being such that the amount of such variation of said last-named quantities required to produce a null reading of said instrument is determinative of the phase relation of the first voltage and hence of the selected unbalance vibrations.

3. In apparatus for analyzing the unbalance of a rotating body, the combination of a vibration-responsive device adapted to develop a first alternating voltage having characteristics of magnitude and phase which are determined by selected unbalance vibrations of the body, means including a generator for developing a second alternating voltage of the same frequency as the first, said generator comprising a part adapted to rotate synchronously with said body and an independently rotatable part for varying the phase relation of said second voltage, an electrical indicating instrument, means including a circuit interrupter for intermittently impressing the difference of said voltages on said instrument, said circuit interrupter including an element adapted to rotate synchronously with said body for cyclically operating the interrupter and an independently rotatable element for varying the limits of the periods of circuit interruption, and means for simultaneously adjusting the angular positions of the last-named element and of the said independently rotatable generator part, said part and said element bearing a fixed relation to one another such that their angular position required to produce a null reading of said instrument will determine the phase relation of said first voltage and hence of the selected unbalance vibrations of the body.

ERNEST L. THEARLE.